US008240598B2

(12) United States Patent
Redford

(10) Patent No.: US 8,240,598 B2
(45) Date of Patent: Aug. 14, 2012

(54) AIRBORNE ELEVATOR APPARATUS

(76) Inventor: Daniel S. Redford, San Dimas, CA (US)

( * ) Notice: Subject to any disclaimer, the term of this patent is extended or adjusted under 35 U.S.C. 154(b) by 0 days.

(21) Appl. No.: 13/134,158

(22) Filed: May 31, 2011

(65) Prior Publication Data

US 2012/0056032 A1    Mar. 8, 2012

Related U.S. Application Data

(60) Provisional application No. 61/397,685, filed on Jun. 16, 2010.

(51) Int. Cl.
*B64B 1/50* (2006.01)
(52) U.S. Cl. ............................. 244/33; 187/240; 244/115
(58) Field of Classification Search ............... 244/30, 244/31, 33, 115, 156, 158.2; 446/225; 187/240
See application file for complete search history.

(56) References Cited

U.S. PATENT DOCUMENTS

| | | | | | |
|---|---|---|---|---|---|
| 691,719 | A | * | 1/1902 | Greth | ............................... 244/33 |
| 1,928,980 | A | * | 10/1933 | Myers | ............................ 244/116 |
| 3,605,329 | A | * | 9/1971 | Dalli | ............................. 446/225 |
| 4,126,850 | A | * | 11/1978 | Randolph | ...................... 340/983 |
| 5,295,625 | A | | 3/1994 | Redford | |
| 6,224,015 | B1 | * | 5/2001 | Reinhard | ......................... 244/24 |
| 6,227,484 | B1 | | 5/2001 | Miyake | |
| 6,241,160 | B1 | | 6/2001 | Redford | |

* cited by examiner

*Primary Examiner* — Rob Swiatek
(74) *Attorney, Agent, or Firm* — Monty Simmons; Simmons Patents

(57) ABSTRACT

An Airborne Elevator Apparatus capable of deploying at the same time multiple service loads at different altitudes in the Earth's atmosphere by physically separating tether weight carrier function from the service load weight carrier function of a common aerostat. The tether weight carrier function is performed by at least one airborne canopy assembly (20) filled with lighter than air gas, which has enough lifting power to support its own weight and the weight of the attached airborne cables (30). The service load carrier function is performed by several airborne booster assemblies (51). Designed to glide on the apparatus's airborne cables (30), an airborne booster assembly (51) filled with lighter than air gas has enough lifting power to carry its own weight and the weight of a service load at altitudes below the uppermost canopy. For stability purposes, the apparatus is designed to rotate around its vertical axis.

24 Claims, 8 Drawing Sheets

AIRBORNE ELEVATOR APPARATUS

This application was originally filed as a Provisional Patent Application on Jun. 16, 2010 and was assigned Ser. No. 61/397,685.

TECHNICAL FIELD

The invention generally relates to the field of hybrid tethered aerostats, and more particularly to airborne elevators.

BACKGROUND ART

Contemporary interest in using tethered aerostats to carry and execute various surveillance and communication missions is growing. Unlike fixed-wing aircrafts or helicopters, these aerostats use helium or hydrogen to stay aloft. They are unmanned, inexpensive, and anchored to the ground by a tethering system that also provides power and communication.

Webster's Dictionary defines the term "service load" as the "load a structure is expected to support under normal usage".

A tethered aerostat is designed to elevate and keep a service load at a predetermined deployment altitude in the Earth's atmosphere. Its lifting force should be sufficient to support its own weight, the weight of the tether, and the weight of a service load. Because tether's weight increases with altitude, an aerostat's operational altitude and its maximum service load are capped by design.

Also, a tethered aerostat is subject to wind migration; the wind will push away the aerostat from the ideal vertical deployment position. In order to keep the same altitude, the aerostat's tether must be longer, and because it is moving away from the vertical position the tether will also develop slack. The stronger the wind, the larger the migration from the vertical deployment position; the larger the tether's slack, the larger the tether's weight. This additional weight will pull down the aerostat from its initial altitude.

The present invention relates to a service load neutral, self-stabilizing Airborne Elevator Apparatus capable of deploying at the same time multiple service loads at different altitudes in the Earth's atmosphere.

To explain the present invention's service load neutrality feature, a comparison to a regular elevator is in order.

In most basic embodiment the Airborne Elevator Apparatus is comprised of:
   Airborne means for positioning the apparatus in the Earth's atmosphere,
   Airborne means for deploying at the same time multiple service loads at different altitudes along said positioning means, and
   Means for controlling the apparatus in operation.
In comparison, a non-airborne elevator would have:
   Means for positioning the elevator adjacent or within a building structure, represented by the elevator's vertical shaft built around a building structure and the guiding rails attached to the shaft,
   Means for deploying a service load, represented by the elevator's cabin and its means of moving up and down on the guiding rails of the elevator's shaft, and
   Means for controlling the position of the elevator's cabin, represented by several control panels positioned inside the elevator's cabin, and on the floors serviced by the elevator.

The main novelty of the present invention, outside the fact that its positioning and service load deployment means are airborne, is its service load neutrality feature. This feature offers the equivalent of having several cabins sharing the same guiding rails of a regular elevator without putting any load on the elevator's shaft and implicitly on the building structure.

A search of the prior art did not disclose any patents that read on the instant invention, and none of the prior art related to tethered aerostats can claim to be load neutral or to deploy at the same time multiple service loads at different altitudes in the Earth's atmosphere. However, the following U.S. patents are considered related:

| U.S. Pat. No. | INVENTOR | ISSUED |
| --- | --- | --- |
| 5,295,625 | Redford | Mar. 22, 1994 |
| 6,227,484 | Miyake | May 8, 2001 |
| 6,241,160 | Redford | Jun. 5, 2001 |

Redford teaches a long, hollow, cylindrical apparatus suspended in the atmosphere by toroidal balloons positioned along its height. The apparatus promotes convective air movements inside it, as a way to collect, transport, and distribute condensed water from the water vapor present in the air moving inside. The apparatus' operational altitude in the atmosphere is controlled by a cable wound on a motorized reel attached to the ground. A Balloon enclosure suspends the apparatus' water vapor condenser. The condenser's surfaces condenses the water vapor ascending inside the apparatus and transfers the collected water to the lower section of the apparatus using a helicoidally shaped pipe system inside the apparatus' cylindrical column. The water moving down through the helicoidally shaped pipe system will also rotate the apparatus around its vertical axis to increase its wind stability in the atmosphere. When the condensed water reaches the bottom of the apparatus it is dispersed to the ground through a water distribution ring.

Miyake teaches a tethered spherical balloon having an envelope inflated with lighter than air gas, a gondola attached to the bottom of the balloon's envelope, a vertical stabilizer attached to the same balloon's envelope, and a connecting assembly to anchor the balloon via a tether to a motorized drum positioned on the ground. The connecting assembly is positioned opposite of the balloon's vertical stabilizer, with the gondola disposed in-between in a vertical plan containing the center of the spherical balloon and its gravity center. This feature gives increased wind stability to the tethered spherical balloon. The vertical stabilizer also gives the balloon's gondola stability in windless conditions. When deployed at lower altitudes in the Earth's atmosphere, below 150 meters, the tethered spherical balloon's gondola remains vertical and relatively motionless even at wind speeds above 7 meters per second. This feature allows cameras positioned in the balloon's gondola to take aerial bird's-eye view photography and video not possible with a regular tethered balloon.

Redford teaches a large diameter, tall, hollow, air transport shuttle tethered from the ground and having a cylindrical shaped tower on its upper section that hosts a cylindrical balloon and the apparatus air exhaust valves, and a variable length conical column on its lower section hosting a large air intake valve. The apparatus suspending system comprises an auxiliary balloon enclosure and a large diameter circular ring balloon positioned around the cylindrical shaped tower, both filled with lighter than air gases. The auxiliary balloon has enough lifting force to support its own weight and the weight of the cylindrical tower. The large diameter circular ring balloon is designed to support its own weight, the weight of the balance of the apparatus including its tether, and to provide additional lifting force to elevate the apparatus at higher altitudes for operational based reasons. The descending of the air transport shuttle to lower altitudes is controlled by the tether wound on a motorized reel attached to the ground. The cylindrical balloon placed inside the apparatus' cylindrical tower, is used to compensate from the variation of outside air density during the ascending and descending cycles of the air transport shuttle. The auxiliary balloon enclosure and the large diameter circular ring balloon have gyro-sails to rotate the apparatus during ascending and descending phases in order to gyroscopically stabilize the apparatus operating under wind conditions. As an inversion layer destabilizer the apparatus loads on its air transport shuttle a large volume of humid air located below an atmospheric inversion layer. By carrying this volume of air to a higher altitude in the atmosphere, the apparatus is dehumidifying and consequently heating the air inside its air transport shuttle. This hot and dry air present inside the air transport shuttle is released at an altitude below the atmospheric inversion layer to trigger the inversion layer's thermal destabilization.

DISCLOSURE OF THE INVENTION

The apparatus and function of the present invention are directed to eliminate the limitations of current aerostats. The Airborne Elevator Apparatus is designed to separate a tether weight carrier from a service load carrier. This design feature allows the apparatus to deploy at the same time multiple service loads at different altitudes in the Earth's atmosphere without increasing the apparatus' tether weight.

The tether weight carrier function of the apparatus is performed by one or more airborne circular canopy assemblies filled with lighter than air gas. An airborne circular canopy assembly is designed to support its own weight, as well as the weight of its attached airborne cables that are replacing the tether of a current aerostat. These airborne cables connect the circular canopy assembly to a revolving circular platform positioned on a main platform assembly. Several anchor subassemblies positioned at the periphery of the main platform assembly are designed to anchor the apparatus to a ground or water-based service area.

The apparatus' service load carrier function is performed by several airborne self-propelled booster assemblies filled with lighter than air gas. Designed to glide on the apparatus' set of airborne cables, a booster assembly will carry its own weight and the weight of a service load for deployment at a desired altitude along said airborne cables.

The apparatus' modular design will permit several airborne booster assemblies to be coupled to carry a larger service load in a similar way that several locomotives are coupled to pull a longer and heavier train.

The apparatus' airborne circular canopy assembly has the characteristics of an upgraded circular disk-wing. The circular disc-wing has largely escaped scientific scrutiny. The literature detailing the aerodynamics of the circular disc-wing is almost rare, and derives from inter-related fields such as fluid mechanics, aeronautical and sports engineering.

In 1972, the US Navy commissioned a project to further development of a self-suspended flare, which was essentially a spin-stabilized axi-symmetric flying disc. Stilley & Carstens investigated the aerodynamics of the flare and other similar flying discs. Wind tunnel tests results were published as typical plots of axial, normal and pitching moment coefficients. Bio-mechanic and aerodynamic analysis, mathematical models, computer simulations and flow visualization have enabled an explanation of the circular disc-wing physics.

The apparatus' circular canopy assembly and its canopy-stabilizer sub-assembly resemble a "dual deck flying saucer", a novel Tandem Gyroscopic Inertial Structure compounding the Coanda Effects with Bernoulli fluid dynamics, and the Law of Momentum Conservation. In addition, the canopy-stabilizer subassembly augments the canopy's stability by lowering its center of gravity below the buoyancy center. This high stability feature of the circular canopy assembly expressed in relation to each axis yaw, roll and pitch, allows the return to a state of equilibrium, where the net sum of forces equals zero, after any wind disturbance.

To increase its stability in the atmosphere, the apparatus is designed to rotate around its vertical axis, acting like a tall vertical gyroscope in the atmosphere. This feature was inspired by the behavior of a tropical hurricane, which is the only weather system that moves hundreds of miles east to west in the Earth's atmosphere. A developed hurricane system that resembles a huge cylindrical gyroscope is stable because of its huge gyroscopic inertia which causes the Earth and its atmosphere to move above and around it respectively. An observer positioned on the Earth's surface will have the illusion that the hurricane is moving from east to west, when in reality the hurricane structure is stable and the Earth and its atmosphere is moving west to east.

The apparatus' control system is distributed between a main controller located on the main platform assembly and several airborne controllers located on each airborne booster assembly. This concept has simplified the control of the apparatus by allowing only one type of airborne controller, while limiting its deployment only to the apparatus' airborne booster assemblies.

The main controller comprises four resident controllers: a Wire Communication Controller, a Power Distribution Controller, an Altitude Controller, and a Stability Controller.

The Wire Communication and Power Distribution Controllers follow the current industry standards and do not require further analysis. Their customization to accommodate the specific apparatus' needs is considered a routine engineering task.

The apparatus' airborne controllers are monitoring the gyro-control propellers installed on each airborne canopy assembly, and the swivel propellers and electrical cable climbers installed on each booster assembly.

There are four electrical cable climbers, four swivel propellers on each airborne booster assembly, and at least four Gyro-control propellers on each circular canopy assembly.

The electrical energy required to operate the apparatus is distributed by two of the four airborne cables customized as a power access bus. The wire communication is facilitated by the remaining two airborne cables customized as a communication bus.

To implement rotational stability, electrical gyro-control propellers are used to rotate and synchronize the rotational speed of all airborne canopy assemblies and airborne cables, with the rotational speed of the revolving circular platform positioned on the apparatus main platform assembly.

To insure the vertical alignment of all airborne assemblies of the apparatus, the stability controller employs two independent control modules: the GPS Sync and the Rotational Sync. Since the GPS Sync and Rotational Sync control modules operate simultaneously, propellers positioned on each airborne assembly of the apparatus are assigned either to the GPS Sync or to Rotational Sync control modules.

The control protocols for the GPS Sync and Rotational Sync control modules are customized to reflect the apparatus' operational mode—Modus Operandi (M.O.). Based on the deployment environment the apparatus may be operated in three M.O.:

1. M.O.1: "Stationary Non-Gyro", where the apparatus' non-revolving main platform assembly is anchored to a stationary ground or water-based service area, and its circular platform and all its airborne assemblies do not rotate,
2. M.O.2: "Stationary Gyro", where the apparatus' non-revolving main platform assembly is anchored to a stationary ground or water-based service area, and its circular platform and all its airborne assemblies are rotating in a synchronized manner, and
3. M.O.3: "Mobile Gyro", where the apparatus non-revolving main platform assembly is airborne or is anchored to a mobile ground or water-based service area, and its circular platform and all its airborne assemblies are rotating in a synchronized manner.

The apparatus' pilot will determine based on the operation environment the best M.O., and will setup accordingly the stability controller's operating parameters.

The GPS Sync control module requires global positioning (gp) receivers to be installed on the apparatus' revolving circular platform assembly and on all airborne booster assemblies. A GPS Sync Request signal generated by the stability controller will be transmitted to the apparatus' revolving platform and to all airborne booster assemblies, which will trigger the reading and storage of gp coordinates of all GPS receivers. Each airborne controller will compare its own gp coordinates with the one received from the stability controller. Based on this comparison, an airborne controller will decide on the orientation and speed of all swivel propellers under the control of the GPS Sync to correct the vertical alignment of the airborne assembly.

The altitude controller employs two independent altitude control modules: one dedicated to the apparatus' uppermost canopy, and a second dedicated to all airborne booster assemblies.

The altitude of the apparatus' uppermost canopy assembly is regulated by four winches positioned on the apparatus' revolving circular platform assembly. These winches are employed to control the length of the airborne cables attached to the uppermost canopy.

The altitude of an airborne booster assembly is controlled by its cable climbers and dedicated swivel propellers employed to move the airborne booster assembly up and down along the airborne cables. In this way, each airborne booster assembly may ascend and descend autonomously to any desired altitude below the altitude of the apparatus' uppermost canopy. Once the desired altitude has been reached, the airborne booster assembly's cable climbers will lock on the airborne cables.

When the apparatus is redeployed to a different service area, its main platform assembly will operate airborne. The four high-thrust swivel propellers positioned on the periphery of the apparatus' main platform assembly to lift and transport the apparatus to a different service area, will be remotely operated from an airborne command aircraft, such a transport helicopter.

Therefore, the primary objective of the present invention is to eliminate the limitations of current tethered aerostats and separate the tether weight carrier from the service load carrier.

It is an additional objective of the present invention to have the apparatus' tether weight carrier function performed by one or more airborne canopy assemblies filled with lighter than air gas. An airborne canopy assembly is designed to support its own weight, as well as the weight of attached airborne cables that replace the tether of a regular aerostat.

It is an additional objective of the present invention to deploy at the same time at different altitudes in the Earth's atmosphere multiple service loads by employing several airborne self-propelled booster assemblies filled with lighter than air gas. Designed to glide on the apparatus' airborne cables, an airborne booster assembly will carry its own weight and the weight of a service loads for deployment at a desired altitude along the airborne cables.

It is a further objective of the present invention to have the apparatus' airborne canopy assembly shaped as a circular disk-wing with a canopy-stabilizer sub-assembly rigidly attached below it. This design configuration lowers the center of gravity of the airborne canopy assembly below its buoyancy center, and converts the canopy assembly into a tandem gyroscopic inertial structure.

It is an additional objective of the present invention to assure rotational stability of the apparatus by using propellers which are installed on each airborne assembly of the apparatus. The propellers rotate and synchronize the rotational speed of the apparatus' airborne assemblies, with the rotational speed of the apparatus' ground-based revolving circular platform assembly.

It is a further objective of the present invention to ensure the apparatus' verticality by using a Global Positioning System (GPS). Electrical swivel propellers installed on all airborne assemblies of the apparatus are employed to compensate for any wind migration. These propellers are continuously aligning the global position of each airborne assembly of the apparatus with the global positioning of the ground-based circular platform assembly.

It is an additional objective of the present invention to control the altitude of the apparatus' uppermost canopy by using high capacity winches positioned on the apparatus' ground-based revolving circular platform assembly to modify the length of the airborne cables attached to the uppermost canopy.

It is a further objective of the present invention to allow each airborne booster assembly to ascend and descend autonomously to any desired altitude below the altitude of the apparatus' uppermost canopy by using its dedicated swivel propellers to move up and down along the apparatus' airborne cables.

BEST MODE FOR CARRYING OUT THE INVENTION

The novelties and advantages of the present invention will be better understood upon consideration of the following description of the best mode for carrying out the invention in conjunction with the accompanying drawings.

The preferred embodiment of the present invention is shown in FIG. 1 to FIG. 5

Figure 1:
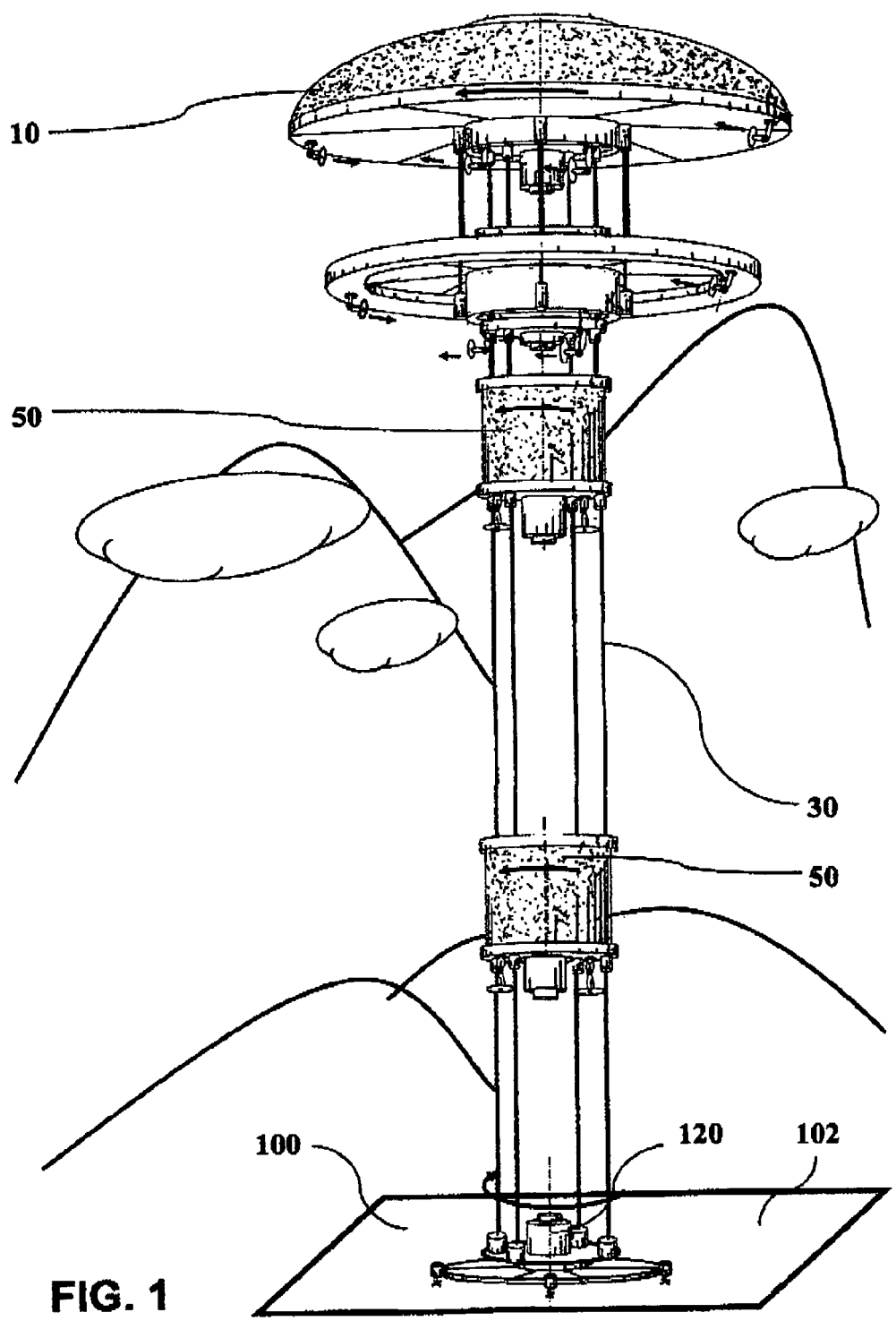
FIG. 1 is an elevation view of the preferred embodiment of the present invention wherein the airborne means for positioning the apparatus in the Earth's atmosphere are configured as an airborne canopy assembly.

FIG. 1 shows the preferred embodiment of the present invention comprising an airborne means 10 for positioning the apparatus in the Earth's atmosphere, airborne means 50 for deploying at the same time multiple service loads at different altitudes in the Earth's atmosphere along the apparatus' means for positioning, and means 120 for controlling the apparatus in operation.

FIG. 1 further shows the apparatus being anchored to a service area 100 that is depicted as a ground-based service area 102.

FIG. 1 furthermore shows the airborne means 10 for positioning the apparatus in the Earth's atmosphere, further comprising airborne cables 30.

Figure 2:
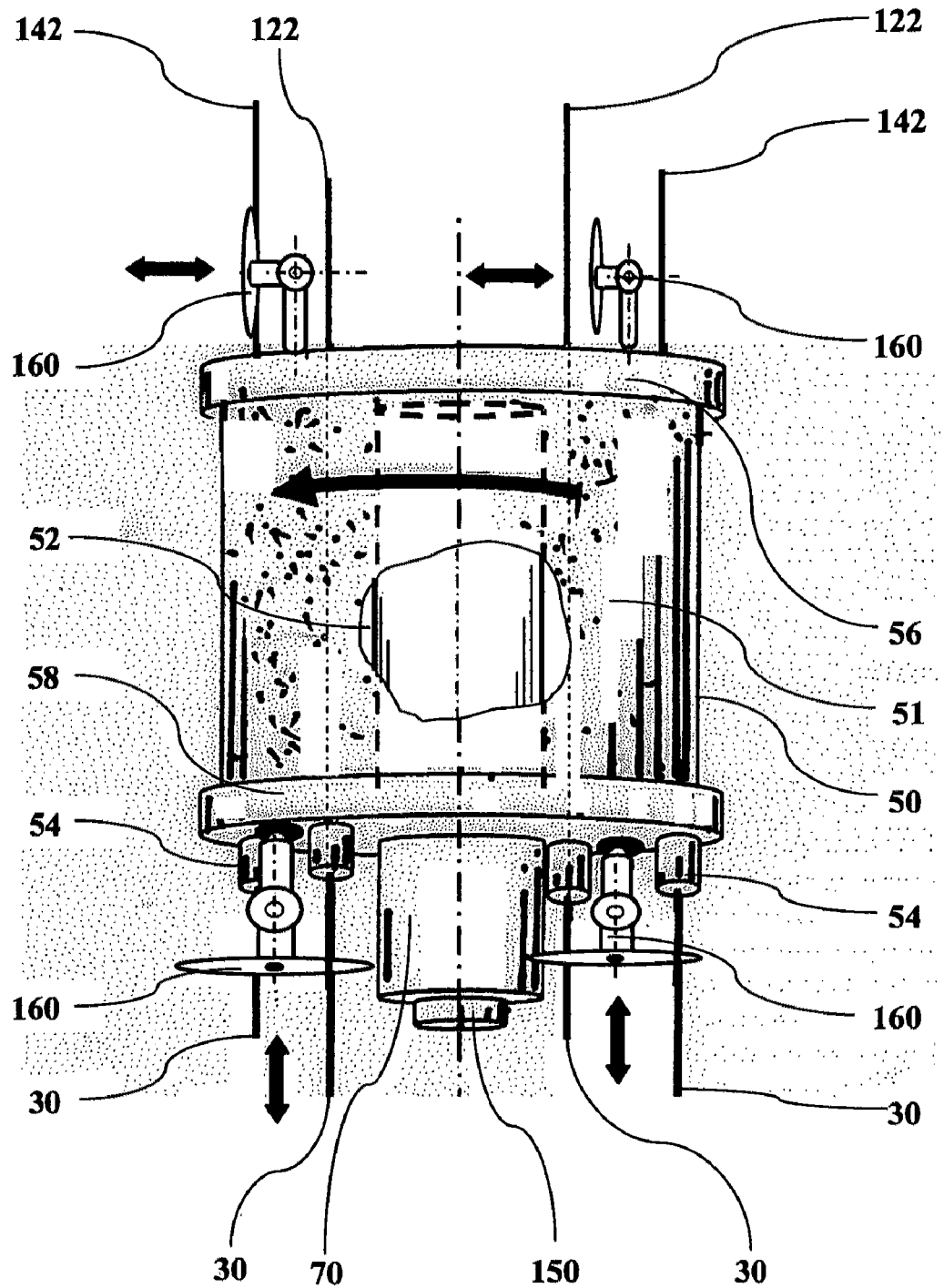
FIG. 2 is an enlarged elevation view of the airborne means for deploying service loads configured as an airborne booster assembly.

FIG. 2 shows the airborne means 50 for deploying a service load, further comprising a booster assembly 51.

FIG. 2 further shows the booster assembly 51, comprising a toroidal shaped cylindrical body 52 filled with lighter than air gas, a lower ring-platform sub-assembly 58, an upper ring-platform sub-assembly 56, and a service load bay sub-assembly 70.

FIG. 2 also shows the service load bay sub-subassembly 70 further comprising an airborne controller 150.

FIG. 2 further shows the lower ring-platform sub-assembly 58 comprising four cable climber sub-assemblies 54 and two swivel propellers 160 configured as a Pushing Up/Down propelling system.

FIG. 2 furthermore shows the upper ring-platform sub-assembly 56 comprising two swivel propellers 160 configured as Pull Left/Right propelling system.

FIG. 2 also shows the airborne cables 30 further comprising two cables 122 configured as an electrical power access bus, and two cables 142 configured as a wire communication bus.

Figure 3:
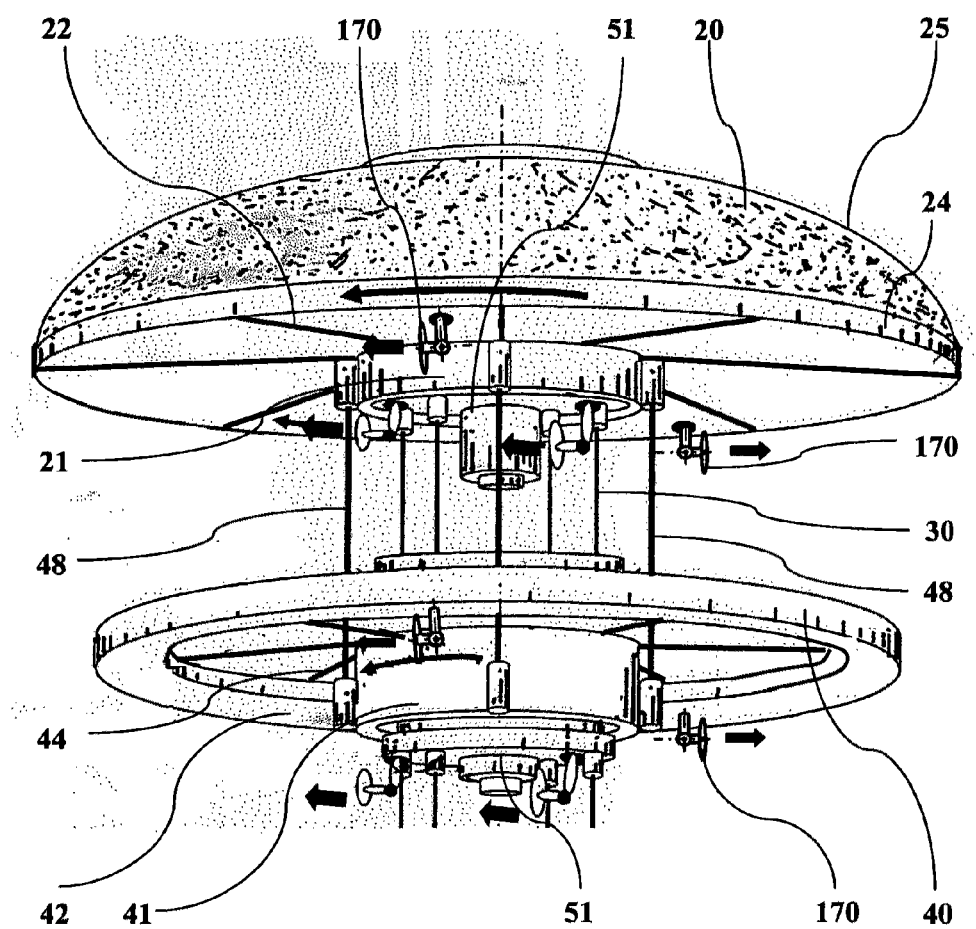
FIG. 3 is an enlarged elevation view of the airborne canopy assembly.

FIG. 3 shows the airborne canopy assembly 20 further comprising a canopy-envelope sub-assembly 25, a canopy-rim 24, a canopy-hub 21, and a plurality of canopy-spokes 22 connecting the canopy-hub 21 to the canopy-rim 24.

FIG. 3 also shows the airborne canopy assembly 20 further comprising a canopy-stabilizer sub-assembly 40.

FIG. 3 further shows the canopy-stabilizer sub-assembly 40 comprising a stabilizer-rim 42, a stabilizer-hub 41, and a plurality of stabilizer-spokes 44 connecting the stabilizer-hub 41 to the stabilizer-rim 42.

FIG. 3 further shows the airborne canopy assembly 20 comprising a plurality of vertical rods 48 employed to connect the stabilizer-hub 41 to the canopy-hub 21.

FIG. 3 furthermore shows the airborne canopy assembly 20 comprising four gyro-control propellers 170, two positioned diametrically opposed on the canopy-rim 24 and two positioned diametrically opposed on the stabilizer-rim 42, and employed to control the rotational speed of the airborne canopy assembly 20.

FIG. 3 also shows the airborne canopy assembly 20, further comprising two booster assemblies 51 positioned inside the canopy-hub 21, and inside the stabilizer-hub 41.

Figure 4:
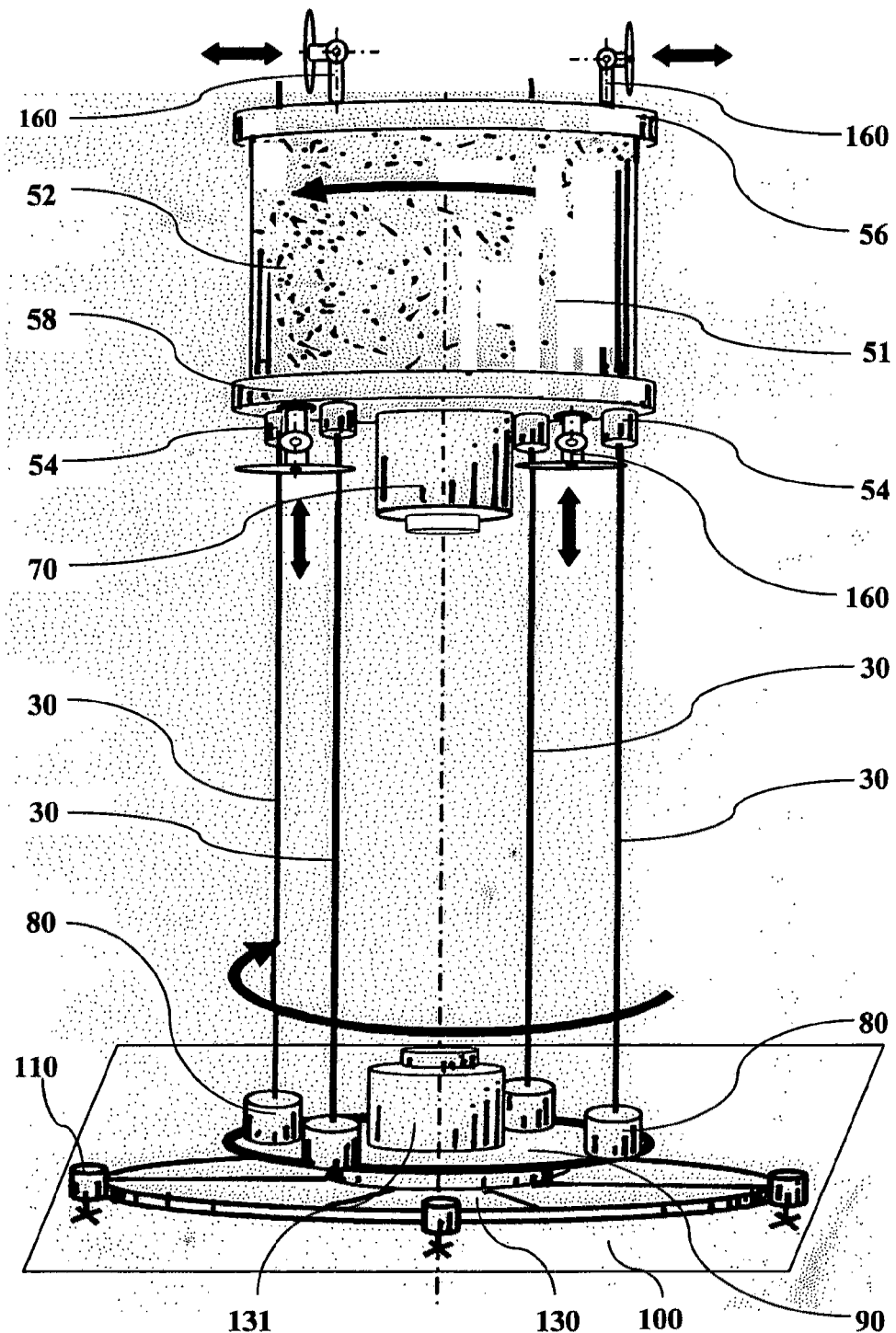
FIG. 4 is an enlarged elevation view of the means for controlling the apparatus in operation shown together with an airborne booster assembly.

FIG. 4 shows the booster assembly 51 having two swivel propellers 160 positioned on its upper ring-platform sub-assembly 56 configured as rotating propelling system.

FIG. 4 also shows the apparatus' control means 120 comprising a main platform assembly 130, a control house assembly 131, and a circular platform assembly 90, designed to rotate around said control house assembly 131.

FIG. 4 further shows the circular platform assembly 90, further comprising four winches 80 employed to control the length of the airborne cables 30.

Figure 5:
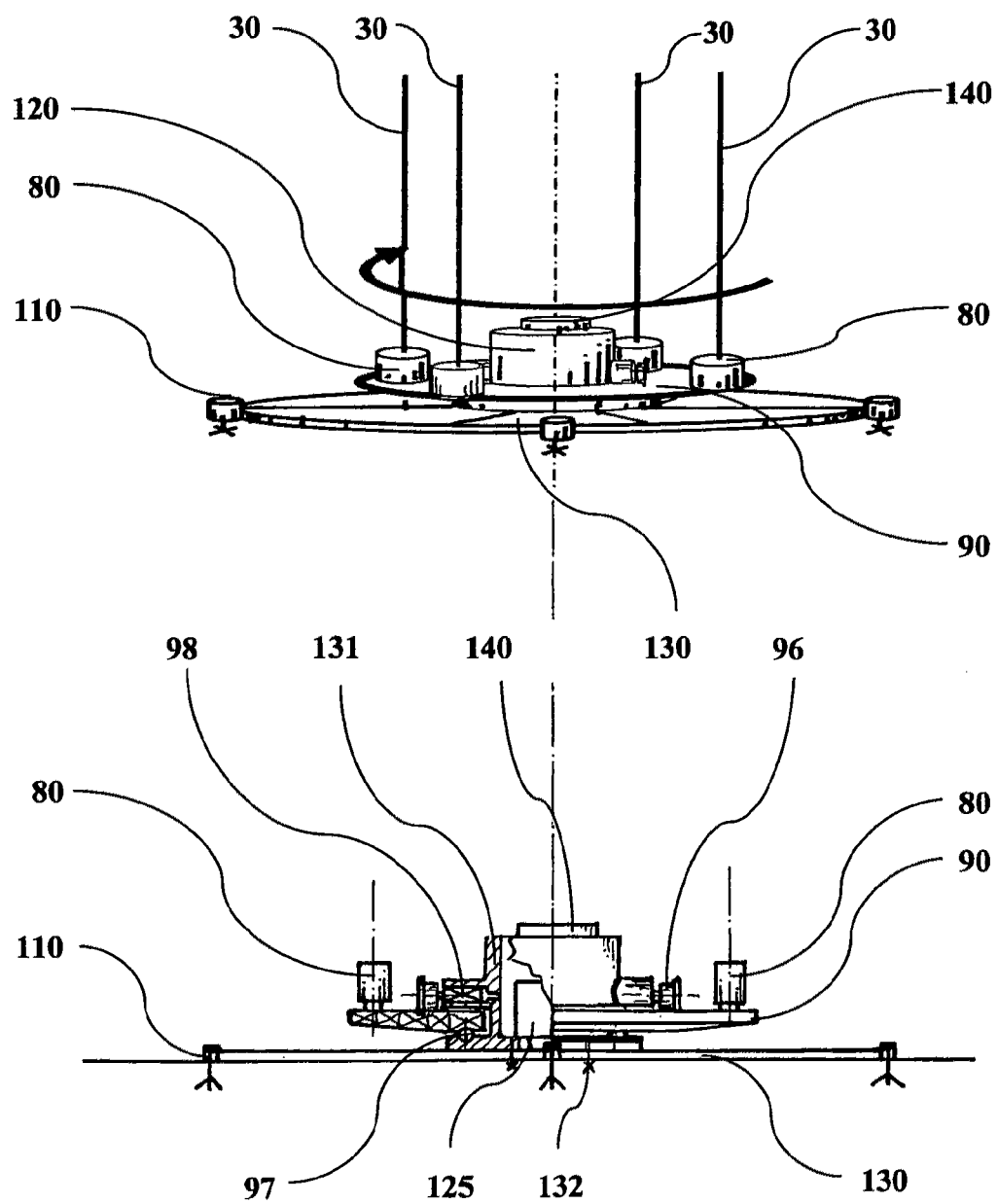
FIG. 5 is an enlarged elevation view of the means for controlling the apparatus in operation shown together with a partial cross-sectional view of the same.

FIG. 5 shows the main platform assembly 130 further comprising four anchor sub-assemblies 110 designed to anchor said main platform assembly 130 to a service area 100.

FIG. 5 also shows the control house assembly 131 being attached to the main platform assembly 130 with a plurality of fasteners 132.

FIG. 5 further shows the control housing assembly 131 comprising electrical motors 98 coupled with pinion-gear sub-assemblies 96 to engage and rotate the circular platform assembly 90.

FIG. 5 further shows the control house assembly 131 further comprising an axial bearing sub-assembly 97 that allows the rotation of the circular platform assembly 90 in reference to the control house assembly 131.

FIG. 5 also shows control housing assembly 131 further comprising a power generator sub-assembly 125 and a main controller 140.

Figure 6:
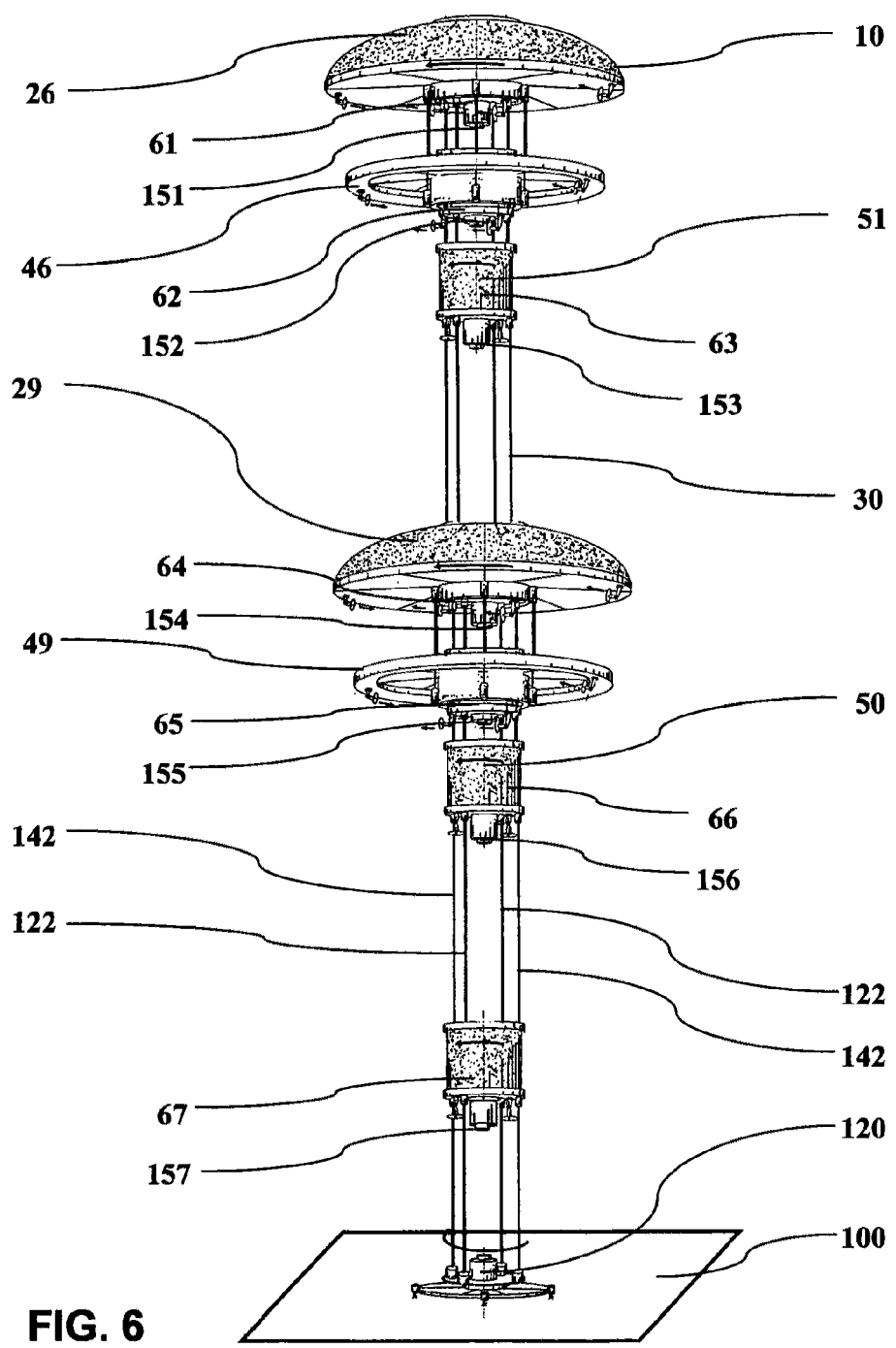
FIG. 6 is an elevation view of the second embodiment of the present invention wherein the airborne means for positioning the apparatus in the Earth's atmosphere are configured as two circular airborne canopy assemblies filled with lighter than air gas, and positioned at different altitudes in the atmosphere.
Figure 7:
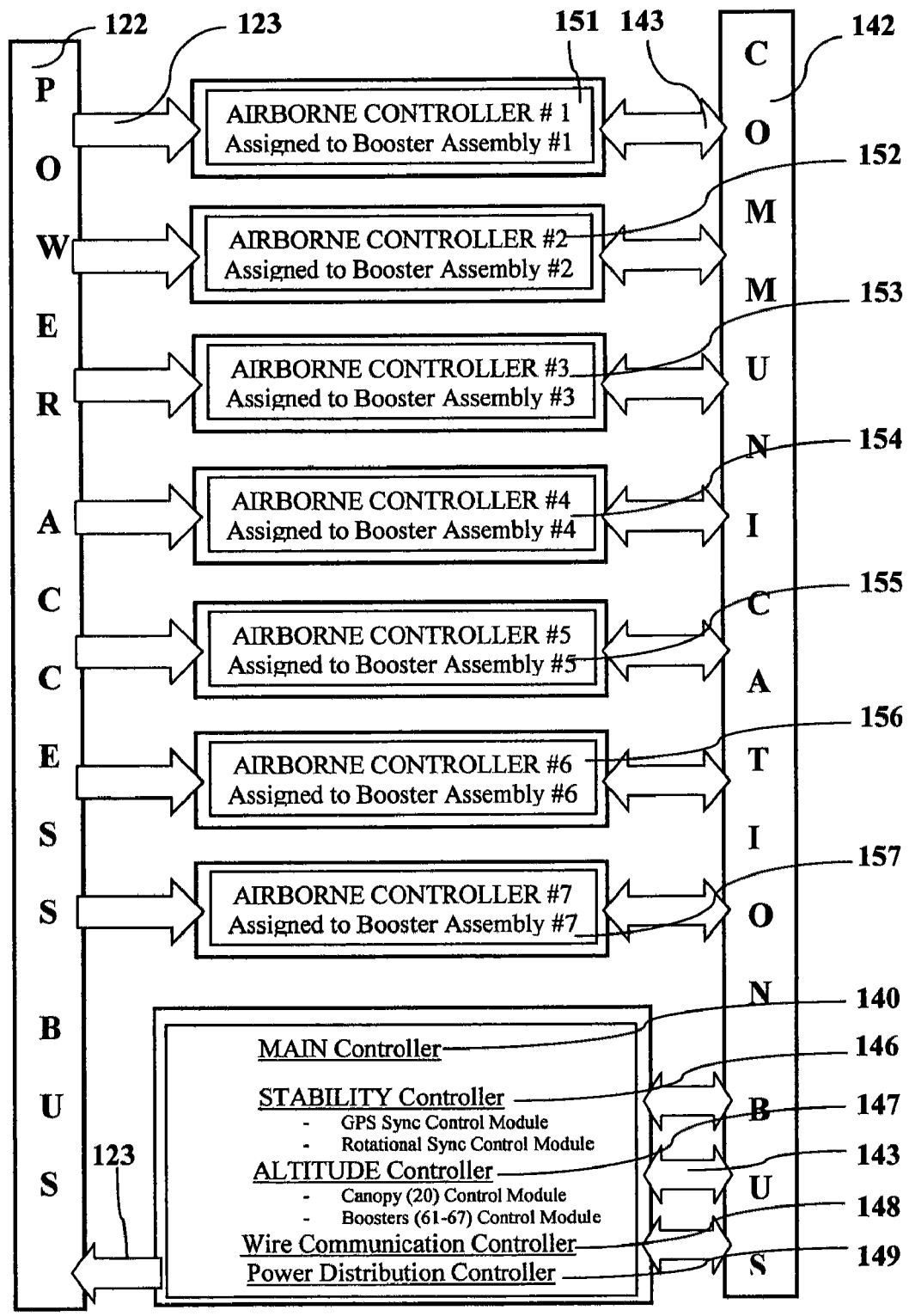
FIG. 7 is the apparatus's control diagram customized for the second embodiment of the present invention.

The second embodiment of the present invention is shown in FIG. 6 and FIG. 7

FIG. 6 shows the second embodiment of the present invention where the airborne means 10 for positioning the apparatus in the Earth's atmosphere comprises an uppermost airborne canopy assembly 26 and a second airborne canopy assembly 29, filled with lighter than air gas and positioned at different altitudes in the atmosphere in order to share the load generated by the longer and implicitly heavier airborne cables 30.

FIG. 6 further shows:

a first booster assembly 61 with a first airborne controller 151 deployed inside an uppermost airborne canopy assembly 26 on the apparatus' airborne cables 30, a second booster assembly 62 with a second airborne controller 152 deployed inside an uppermost airborne canopy-stabilizer sub-assembly 46 on the apparatus' airborne cables 30, a third booster assembly 63 with a third airborne controller 153 deployed below the canopy-stabilizer 46 on the apparatus' airborne cables 30, a fourth booster assembly 64 with a fourth airborne controller 154 deployed inside a second airborne canopy assembly 29 on the apparatus' airborne cables 30, a fifth booster assembly 65 with a fifth airborne controller 155 deployed inside a second airborne canopy-stabilizer sub-assembly 49 on the apparatus' airborne cables 30, a sixth booster assembly 66 with a sixth airborne controller 156 deployed below the canopy-stabilizer 49 on the apparatus' airborne cables 30, and a seventh booster assembly 67 with a seventh airborne controller 157 deployed below the sixth booster assembly 66 on the apparatus' airborne cables 30.

FIG. 7 shows that the apparatus' control system of the second embodiment is distributed between a main controller 140, and the seven airborne controllers 151 to 157 deployed on the seven booster assemblies 61 to 67.

FIG. 7 also shows the main controller 140 comprising a stability controller 146, an altitude controller 147, a wire communication controller 148, and a power distribution controller 149.

FIG. 7 further shows the main controller 140 using a electrical power access bus 122 and a wire communication bus 142 to interact with the seven airborne controllers 151 to 157.

FIG. 7 further shows the apparatus electrical power distribution controller 149 employing the electrical power access bus 122 and a plurality of unidirectional gates 123 to distribute power to the seven booster assemblies 61 to 67.

FIG. 7 further shows how the stability controller 146 and the altitude controller 147 are communicating to the seven airborne controllers 151 to 157 via the wire communication bus 142 using a plurality of a bi-directional gates 143.

The stability controller 146 is employed to synchronize the rotational speed of the circular platform assembly 90 with the rotational speed of all the apparatus' airborne assemblies.

In addition, the apparatus' stability controller 146 is also managing the alignment of the vertical axis of all airborne assemblies of the apparatus with the vertical axis of the circular platform assembly 90.

FIG. 7 also shows the first booster assembly 61 and second booster assembly 62 controlling the stability of the uppermost airborne canopy assembly 26 and the uppermost airborne canopy-stabilizer sub-assembly 46 by using their airborne controllers 151 and 152.

FIG. 7 also shows the fourth booster assembly 64 and the fifth booster assembly 65 controlling the stability of the second airborne canopy assembly 29 and the second airborne canopy-stabilizer sub-assembly 49 by using their airborne controllers 154 and 155.

FIG. 7 furthermore shows the apparatus' third booster assembly 63, sixth booster assembly 66, and seventh booster assembly 67 as independent booster assemblies that are employing their airborne controllers 153, 156 and 157 to control their own altitude and stability.

Figure 8:
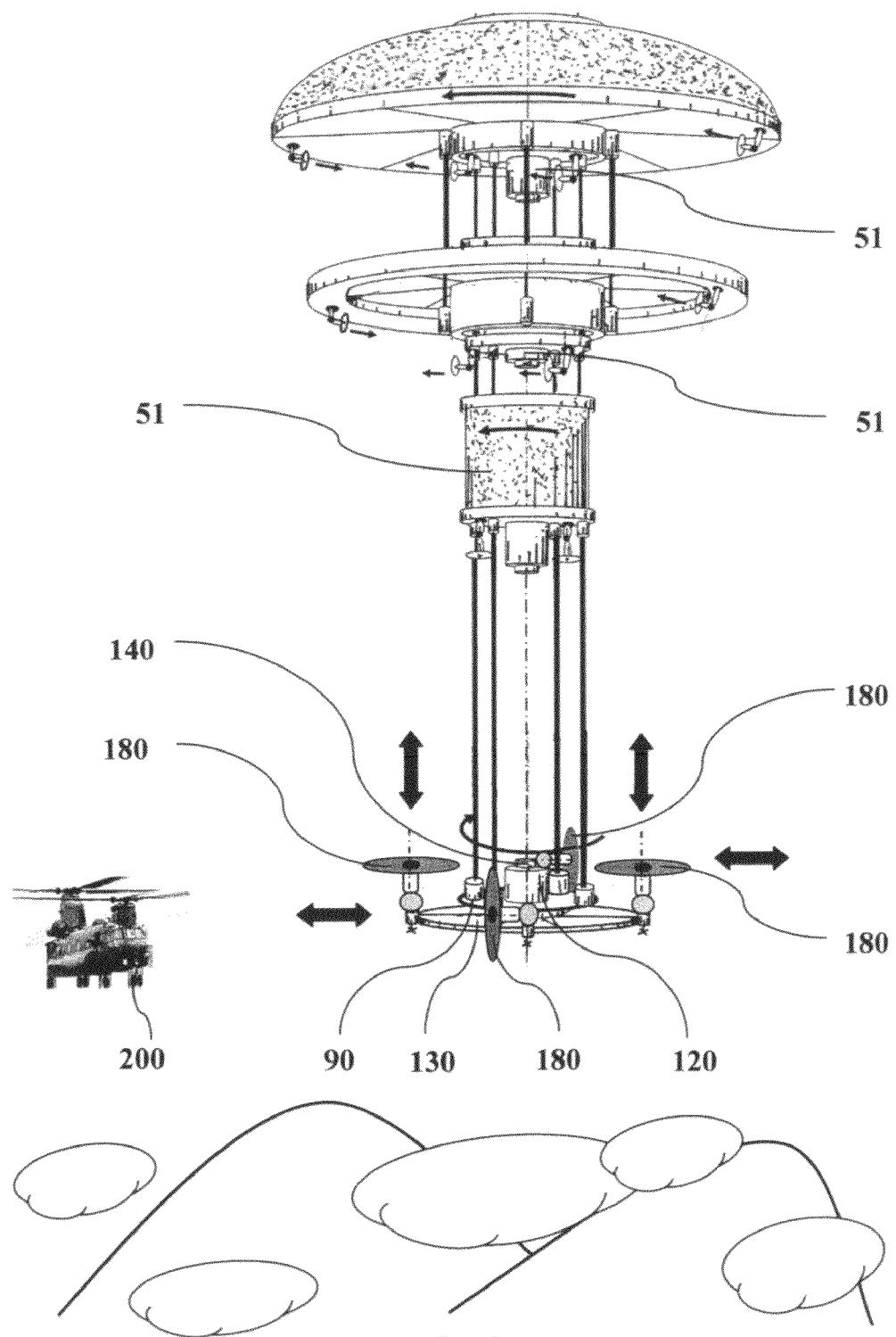
FIG. 8 is an elevation view of the third embodiment of the present invention wherein the apparatus is gyrating and its main platform assembly is configured airborne.

The third embodiment of the present invention is shown in FIG. 8

FIG. 8 shows the apparatus' main platform 130 further comprising four high-thrust swivel propellers 180 powerful enough to elevate and transport the main platform 130 to redeploy the apparatus to a different service area, while the apparatus is in operation.

FIG. 8 further shows two of the high-thrust propellers 180 configured as ascending/descending propellers and two configured as horizontal transport propellers.

FIG. 8 also shows an airborne command aircraft 200 remotely controlling the operation of apparatus' during its redeployment.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:

1. An airborne elevator apparatus comprising:
a) a main platform assembly anchored to a ground or water-based service area by at least one anchor sub-assembly, wherein said main platform assembly further comprises a centrally-attached control house assembly and a circular platform assembly positioned above said main platform assembly, capable of rotating around said control house assembly,
b) an airborne canopy assembly having at least two airborne cables, wherein each cable has a first end and a second end, with the first end attached to said airborne canopy assembly, and with the second end attached to said circular platform assembly, wherein said airborne canopy assembly further comprises a canopy-rim, a canopy-hub, a plurality of canopy-spokes, and a canopy-envelope sub-assembly filled with lighter than air gas, wherein said canopy-envelope sub-assembly has enough buoyancy to support the weight of said airborne canopy assembly and the weight of said airborne cables, wherein said airborne canopy assembly further comprises a canopy-stabilizer sub-assembly positioned to lower the center of gravity of said canopy assembly below its buoyancy center, and
c) at least two airborne booster assemblies for carrying and deploying at the same time service loads at different altitudes by gliding along said airborne cables, wherein said at least two airborne booster assemblies each further comprises a toroidal shaped cylindrical body filled with lighter than air gas to develop enough buoyancy to support its own weight and the weight of a service load, wherein said at least two airborne booster assemblies each further comprises upper-ring and lower-ring sub-assemblies, and a service load bay sub-assembly, wherein said service load bay sub-assembly is positioned within said toroidal shaped cylindrical body and is attached to said upper-ring and lower-ring sub-assemblies.

2. The apparatus as specified in claim 1 wherein said circular platform assembly further comprises at least two winches to control the length of said airborne cables and the deployment altitude of said airborne canopy assembly.

3. The apparatus as specified in claim 1, wherein said canopy-stabilizer sub-assembly further comprises a stabilizer-rim, a stabilizer-hub, and a plurality of stabilizer-spokes, wherein said canopy-hub and said stabilizer-hub are connected by a plurality of rigid rods.

4. The apparatus as specified in claim 1, wherein each booster assembly further comprises at least two cable climber sub-assemblies that are utilized to autonomously ascend, descend, or lock said booster assembly on said airborne cables.

5. An airborne elevator apparatus comprising:
a) a main platform assembly anchored to a ground or water-based service area by at least one anchor sub-assembly, wherein said main platform assembly further comprises of a centrally-attached control house assembly and a circular platform assembly positioned above said main platform assembly capable of rotating around said control house assembly, wherein said circular platform assembly further comprises at least two winches to control the altitude of the apparatus,
b) an airborne canopy assembly having at least two airborne cables, wherein each cable has a first end and a second end, with the first end attached to said airborne canopy assembly, and with the second end attached to said winch, wherein said airborne canopy assembly further comprises a canopy-rim, a canopy-hub, a plurality of canopy-spokes, and a canopy-envelope sub-assembly filled with lighter than air gas, wherein said canopy-envelope sub-assembly has enough buoyancy to support the weight of airborne canopy assembly and the weight of said airborne cables, wherein said airborne canopy assembly further comprises a canopy-stabilizer sub-assembly positioned to lower the center of gravity of said canopy assembly below its buoyancy center, wherein said canopy-stabilizer sub-assembly further comprises a stabilizer-rim, a stabilizer-hub, and a plurality of stabilizer-spokes, wherein said canopy-hub and said stabilizer-hub are connected by a plurality of rigid rods, and c) at least two airborne booster assemblies for carrying and deploying at the same time service loads at different altitudes by gliding along said airborne cables, wherein said at least two airborne booster assemblies each further comprises a toroidal shaped cylindrical body filled with lighter than air gas to develop enough buoyancy to support its own weight and the weight of a service load, wherein said at least two airborne booster assemblies each further comprises upper-ring and lower-ring sub-assemblies, and a service load bay sub-assembly, wherein said service load bay sub-assembly is positioned within said toroidal shaped cylindrical body and is attached to said upper and lower-ring sub-assemblies, wherein said at least two airborne booster assemblies further comprise at least two cable climber sub-assemblies that are utilized to autonomously ascend, descend, or lock said at least two airborne booster assemblies on said airborne cables.

6. The apparatus as specified in claim 5 wherein said control house assembly comprises at least one electrical motor driving a pinion-gear sub-assembly capable of rotating said circular platform assembly around said control house assembly.

7. The apparatus as specified in claim 5 wherein said airborne cables are light-weight multipurpose cables capable of transporting and distributing electrical power to all airborne assemblies of the apparatus.

8. The apparatus as specified in claim 5 wherein said lower-ring sub-assembly further comprises at least two swivel propellers configured as a push-up or push-down propelling system for the said booster assembly along said airborne cables.

9. An airborne elevator apparatus comprising:
a) a main platform assembly anchored to a ground or water-based service area by at least one anchor sub-assembly, wherein said main platform assembly further comprises a centrally-attached control house assembly and a circular platform assembly positioned above said main platform assembly, capable of rotating around said control house assembly, wherein said circular platform assembly further comprises at least two winches to control the altitude of the apparatus, wherein said control house assembly comprises at least one electrical motor driving a pinion-gear sub-assembly capable of rotating said circular platform assembly around said control house assembly,
b) an airborne canopy assembly having at least two airborne cables, wherein each cable has a first end and a second end, with the first end attached to said airborne canopy assembly, and with the second end attached to said winch, wherein said airborne canopy assembly further comprises a canopy-rim, a canopy-hub, , a plurality of canopy-spokes, and a canopy-envelope sub-assembly filled with lighter than air gas, wherein said canopy-envelope sub-assembly has enough buoyancy to support the weight of airborne canopy assembly and the weight of said airborne cables, wherein said airborne canopy assembly further comprises a canopy-stabilizer sub-assembly positioned to lower the center of gravity of said canopy assembly below its buoyancy center, wherein said canopy-stabilizer sub-assembly further comprises a stabilizer-rim, a stabilizer-hub, and a plurality of stabilizer-spokes, wherein said canopy-hub and said stabilizer-hub are connected by a plurality of rigid rods, wherein said airborne cables are light-weight multipurpose cables capable of transporting and distributing electrical power to all airborne assemblies of the apparatus, and c) at least two airborne booster assemblies for carrying and deploying at the same time service loads at different altitudes by gliding along said airborne cables, wherein said at least two airborne booster assemblies each further comprises a toroidal shaped cylindrical body filled with lighter than air gas to develop enough buoyancy to support its own weight and the weight of a service load, wherein said at least two airborne booster assemblies each further comprises upper-ring and lower-ring sub-assemblies, and a service load bay sub-assembly, wherein each service load bay sub-assembly is positioned within said toroidal shaped cylindrical body and is attached to said upper and lower-ring sub-assemblies, wherein said booster assembly further comprises at least two cable climber sub-assemblies that are utilized to autonomously ascend, descend, or lock said at least two airborne booster assemblies on said airborne cables, wherein said lower-ring sub-assembly further comprises at least two swivel propellers configured as a push-up or push-down propelling system for each booster assembly along said airborne cables.

10. The apparatus as specified in claim 9 wherein said control house assembly further comprises a power generator sub-assembly.

11. The apparatus as specified in claim 9 wherein said canopy-hub is large enough to host inside an airborne booster assembly.

12. The apparatus as specified in claim 9 wherein said stabilizer-hub is large enough to host inside an airborne booster assembly.

13. The apparatus as specified in claim 9 wherein said canopy-rim further comprises at least two gyro-control propellers positioned to rotate said canopy assembly with its attached airborne cables around the apparatus' vertical axis.

14. The apparatus as specified in claim 9 wherein said stabilizer-rim further comprises at least two gyro-control propellers positioned to rotate said stabilizer ring assembly around the apparatus' vertical axis.

15. The apparatus as specified in claim 9 wherein each airborne booster assembly further comprises an airborne controller.

16. The apparatus as specified in claim 9 wherein said upper-ring sub-assembly further comprises at least two swivel propellers configured to rotate each booster assembly around the apparatus' vertical axis.

17. An airborne elevator apparatus comprising:
a) a main platform assembly anchored to a ground or water-based service area by at least one anchor sub-assembly, wherein said main platform assembly further comprises of a centrally-attached control house assembly and a circular platform assembly positioned above said main platform assembly, capable of rotating around said control house assembly, wherein said circular platform assembly further comprises at least two winches to control the altitude of the apparatus, wherein said control house assembly further comprises a power generator sub-assembly, wherein said control house assembly comprises at least one electrical motor driving a pinion-gear sub-assembly capable of rotating said circular platform assembly around said control house assembly and implicitly around the apparatus' vertical axis, b) an airborne canopy assembly having at least two airborne cables, wherein each cable has a first end and a second end, with the first end attached to said airborne canopy assembly, and with the second end attached to said winch, wherein said airborne canopy assembly further comprises a canopy-rim, a canopy-hub, a plurality of canopy-spokes, and a canopy-envelope sub-assembly filled with lighter than air gas, wherein said canopy-envelope sub-assembly has enough buoyancy to support the weight of airborne canopy assembly and the weight of said airborne cables, wherein said airborne canopy assembly further comprises a canopy-stabilizer sub-assembly positioned to lower the center of gravity of said canopy assembly below its buoyancy center, wherein said canopy-stabilizer sub-assembly further comprises a stabilizer-rim, a stabilizer-hub, and a plurality of stabilizer-spokes, wherein said canopy-hub and said stabilizer-hub are connected by a plurality of rigid rods, wherein said airborne cables are light-weight multipurpose cables capable of transporting and distributing electrical power to all airborne assemblies of the apparatus, wherein said canopy-rim further comprises at least two gyro-control propellers positioned to rotate said canopy assembly with its attached airborne cables around the apparatus' vertical axis, wherein said stabilizer-rim further comprises at least two gyro-control propellers positioned to rotate said stabilizer ring assembly around the apparatus' vertical axis, and c) at least two airborne booster assemblies for carrying and deploying at the same time service loads at different altitudes by gliding along said airborne cables, wherein said at least two airborne booster assemblies each further comprises a toroidal shaped cylindrical body filled with lighter than air gas to develop enough buoyancy to support its own weight and the weight of a service load, wherein each airborne booster assembly further comprises upper-ring and lower-ring sub-assemblies, and a service load bay sub-assembly, wherein said service load bay sub-assembly is positioned within said toroidal shaped cylindrical body and is attached to said upper and lower-ring sub-assemblies, wherein said at least two airborne booster assemblies each further comprises at least two cable climber sub-assemblies that are utilized to autonomously ascend, descend, and lock said at least two airborne booster assemblies on said airborne cables, wherein each lower-ring sub-assembly further comprises at least two swivel propellers configured as a push-up or push-down propelling system for each booster assembly along said airborne cables, wherein each upper-ring sub-assembly further comprises at least two swivel propellers configured to rotate each booster assembly around the apparatus' vertical axis.

18. The apparatus as specified in claim 17 wherein said control house assembly further comprises a main controller.

19. The apparatus as specified in claim 18 wherein said main controller comprises a power distribution controller to manage the electrical power distribution to all airborne assemblies of the apparatus.

20. The apparatus as specified in claim 18 wherein said main controller comprises a wire communication controller to manage the apparatus' wire communication for all airborne assemblies.

21. The apparatus as specified in claim 18 wherein said main controller further comprises an altitude controller to control the altitude of the apparatus' airborne assemblies.

22. The apparatus as specified in claim 18, wherein said main controller further comprises a stability controller employed to synchronize the rotational speed of said circular platform assembly with the rotational speed of all apparatus' airborne assemblies.

23. The apparatus as specified in claim 22, wherein said stability controller is also controlling the alignment of the vertical axis of all airborne assemblies of the apparatus with the vertical axis of said circular platform.

24. An airborne elevator apparatus comprising:

a) a main platform assembly anchored to a ground or water-based service area by at least one anchor sub-assembly, wherein said main platform assembly further comprises of a centrally-attached control house assembly and a circular platform assembly positioned above said main platform assembly, capable of rotating around said control house assembly, wherein said circular platform assembly further comprises at least two winches to control the altitude of the apparatus, wherein said control house assembly further comprises a power generator sub-assembly, wherein said control house assembly comprises at least one electrical motor driving a pinion-gear sub-assembly capable of rotating said circular platform assembly around said control house assembly and implicitly around the apparatus' vertical axis, wherein said control house assembly further comprises a main controller further comprising a power distribution controller, a wire communication controller, an altitude controller and a stability controller, wherein said main platform assembly further comprises four high-thrust swivel propellers employed for apparatus' redeployment, wherein said high-thrust swivel propellers are remotely operated from an airborne command center when the apparatus's main platform assembly is airborne, b) at least two airborne canopy assemblies positioned at different altitudes in the Earth's atmosphere, filled with lighter than air gas for buoyancy purposes, and carrying at least two airborne cables, wherein each airborne cable has a first end and a second end, with the first end attached to the uppermost airborne canopy assembly, and with the second end attached to said winch, wherein said at least two airborne canopy assemblies have enough buoyancy to support their own weight and the weight of said airborne cables, wherein each airborne canopy assembly further comprises a canopy-rim, a canopy-hub, a plurality of canopy-spokes, and a canopy-envelope sub-assembly filled with lighter than air gas, wherein each airborne canopy assembly further comprises a canopy-stabilizer sub-assembly positioned to lower the center of gravity of the said canopy assembly below its buoyancy center, wherein each canopy-stabilizer further comprises a stabilizer-rim, a stabilizer-hub, and a plurality of stabilizer-spokes, wherein said canopy-hub and said stabilizer-hub are connected by a plurality of rigid rods, wherein said airborne cables are light-weight multipurpose cables customized to transport and distribute electrical power to all airborne assemblies of the apparatus, wherein said canopy-rim further comprises of at least two gyro-control propellers positioned to rotate said canopy assembly with its attached airborne cables around the apparatus' vertical axis, wherein said stabilizer-rim further comprises of at least two gyro-control propellers positioned to rotate said canopy-stabilizer sub-assembly around the apparatus' vertical axis, and c) at least two airborne booster assemblies for carrying and deploying at the same time service loads at different altitudes by gliding along said airborne cables, wherein said at least two airborne booster assemblies are further filled with lighter than air gas to develop enough buoyancy to support their own weight and the weight of a service load, wherein said at least two airborne booster assemblies each further comprises a toroidal shaped cylindrical body filled with lighter than air gas, wherein each booster assembly further comprise upper-ring and lower-ring sub-assemblies, and a service load bay sub-assembly, wherein said service load bay sub-assembly is positioned within said toroidal shaped cylindrical body and is rigidly attached to said upper-ring and lower-ring sub-assemblies, wherein said at least two airborne booster assemblies each further comprises at least two cable climber sub-assemblies employed to autonomously ascend, descend, or lock said at least two airborne booster assemblies on said airborne cables, wherein each lower-ring sub-assembly further comprises at least two swivel propellers configured as a push-up or push-down propeller system for each booster assembly along said airborne cables, wherein each upper-ring sub-assembly further comprises at least two swivel propellers configured to rotate each booster assembly around the apparatus' vertical axis.

* * * * *